Oct. 3, 1950        E. R. BARNEY        2,524,509
PROTECTOR FOR GAS PUMP NOZZLES
Filed Feb. 6, 1948
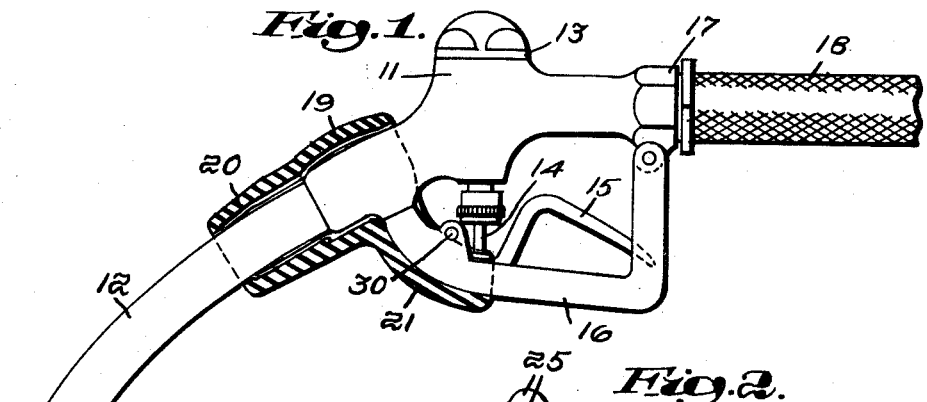
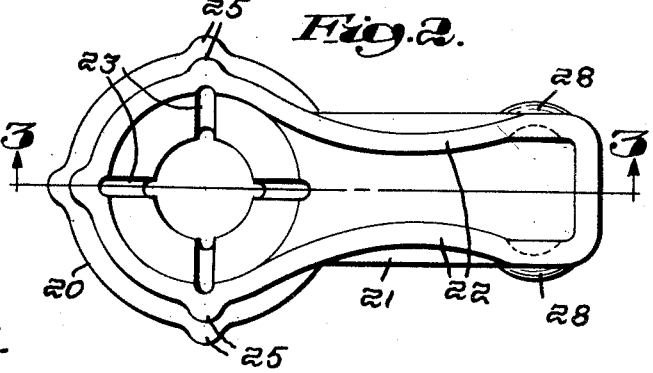
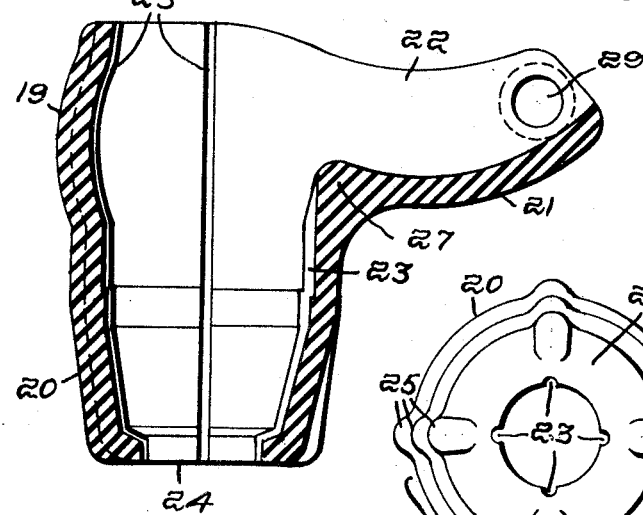
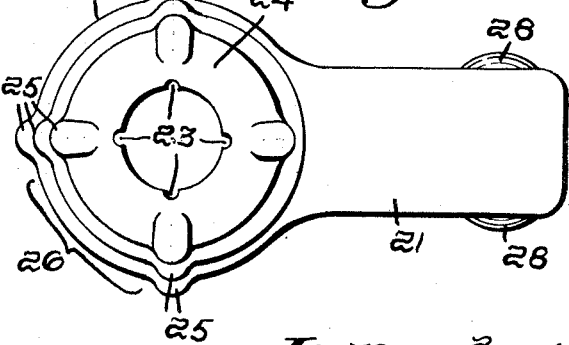
Inventor:
Edwin R. Barney,
by Thomson & Thomson
Attorneys.

Patented Oct. 3, 1950

2,524,509

UNITED STATES PATENT OFFICE 2,524,509

PROTECTOR FOR GAS PUMP NOZZLES

Edwin R. Barney, Waltham, Mass.

Application February 6, 1948, Serial No. 6,655

1 Claim. (Cl. 137—111)

This invention relates to protectors or guards for gas pump nozzles of the type customarily used at filling stations for supplying gasoline to the tanks of motor vehicles.

The principal purpose of the invention is to provide a simple and efficient sleeve-like protector which may readily be applied to the gas dispensing nozzle and which will shield a part of the metal nozzle and its trigger guard from direct contact with the filler spout or finish of the automobile during the filling of the tank, or with the gasoline pump stand when the nozzle is placed in the holster of the pump stand.

As is well known, the conventional practice of filling the gas tank of an automobile requires that the nose of the heavy metal nozzle at the end of a flexible hose be placed in the projecting filler spout of the tank and held in contact with the spout to ground any charges of static electricity created by the flow of gasoline through the hose. In many modern automobiles the filler spout is located under a hinged door in the rear fender of the car, and the insertion of the nozzle into the spout frequently causes the back portion of the nozzle or the front portion of its trigger guard to strike the enameled or lacquered finish of the car, around the rim of the trap door opening, thereby chipping or marring the finish and exposing the fender metal to rusting. The unsightly appearance of the damaged fender and the cost of refinishing is obviated by the use of my improved, cushioning protector which covers the back portion of the guard and the front portion of the trigger guard, without interfering with the handling of the nozzle or the operation of the trigger controlling the supply valve of the nozzle. The nozzle, the automobile and the pump stand are thus guarded from damage by the use of my protector.

Another object of the invention resides in the provision of a nozzle protector made of rubber or other resilient substance, preferably of an electrically conductive and oil-resistant material, and having a sleeve portion and a laterally projecting socket portion, whereby the sleeve may be slid over the nozzle to its proper position, will be held in place by its resilience, and will ground static electricity when rested against the fender opening or directly against the filler spout.

A further feature of the improved protector is the provision of internal longitudinal grooves which constitute channels for the drainage of gasoline leakage from the nozzle valve; and external longitudinal ribs which form intervening channels for venting air, when the sleeve is fitted tightly in the filler spout.

A recommended embodiment of the invention is shown in the accompanying drawings, but it will be understood that the size, shape and structural details of the protector herein illustrated and described may be varied according to the form of the nozzle to which it is applied, without departing from the essence of the invention as defined in the appended clauses.

In the drawing,

Fig. 1 is a side elevation of a conventional gas pump nozzle with the improved protector applied thereto in useful position, the protector being shown in longitudinal section;

Fig. 2 is an enlarged top view of the protector as shown in Fig. 3;

Fig. 3 is a section taken on line 3—3 of Fig. 2; and

Fig. 4 is a bottom view of the protector as shown in Fig. 3.

In the particular form chosen for the purpose of illustration, the improved protector is applied to a conventional type of metal nozzle 11, comprising the neck portion or nozzle proper 12, valve housing 13 and valve stem 14, trigger 15 and trigger guard 16, and union 17 for connection of the flexible hose or gasoline conduit 18.

The protector 19 is preferably made of electrically conductive rubber, and comprises a tubular sleeve portion 20 receiving and fitting over the nozzle 12, and an integral, laterally projecting socket portion 21 embracing the bottom and sides of the front portion of the trigger guard 16 when the sleeve is slid to the back portion of the nozzle as shown in Fig. 1. The upstanding walls 22 of the socket portion are preferably bowed toward each other in molding the rubber protector, so that said walls resiliently grip the sides of the guard 16.

The interior surface of the sleeve portion 20 is preferably grooved longitudinally to form a plurality of channels 23 extending to the mouth 24 of the sleeve, so that any gasoline which may leak from the nozzle valve or otherwise accumulate on the surface of the nozzle will drain through the sleeve and thus diminish possible injury to the rubber protector.

The exterior surface of the sleeve 20 is preferably formed with a plurality of longitudinal ribs 25 defining intermediate, relatively broad channels 26 which permit the escape of air from the filler spout of the gas tank of the automobile, in case the nozzle is inserted to the extent the sleeve fits tightly in the mouth of the spout.

The socket portion 21 protects both the nozzle and the filler spout or car fender from damage by contact when the forward portion of the trigger guard is rested on the spout edge or against the rim of the fender opening; and the protector preferably has a thickened wall 27 at the juncture of the sleeve and socket portions, where contact and wear is most likely to occur, during normal use of the nozzle. The side walls 22 may have protruding buttons 28 defining interior recesses 29 for receiving the ends of a pivot pin 30 of the trigger.

It will be appreciated from the foregoing that the protector cushions any direct contact between the nozzle or its trigger guard and the automobile fender opening or filler spout, when the nozzle is used in the conventional manner for filling the gas tank of the car, and also guards the nozzle and the pump stand from damage when the nozzle is placed in a holster or socket of the pump stand. The protector may be easily and quickly applied to the nozzle, and may be removed whenever necessary for cleaning the nozzle or adjusting its operative elements.

The protector may be molded in one piece from rubber or other suitably resilient material which will cushion impacts against the protected area of the nozzle.

I claim:

A protector for gas pump nozzles of the character described, made of resilient material and comprising a sleeve portion and an integral, laterally projecting socket portion having upstanding side walls, the sleeve portion having interior longitudinal grooves constituting drainage channels extending the length of said portion, and having exterior longitudinal ribs defining channels for the escape of air when the sleeve portion is inserted into the filler spout of a gasoline tank in a motor vehicle.

EDWIN R. BARNEY.

REFERENCES CITED

The following references are of record in the file of this patent:

UNITED STATES PATENTS

| Number | Name | Date |
|---|---|---|
| 814,715 | Lummis et al. | Mar. 13, 1906 |
| 937,570 | Davis | Oct. 19, 1909 |
| 1,008,233 | Zabel | Nov. 7, 1911 |
| 1,646,013 | Cornell | Oct. 18, 1927 |
| 1,839,092 | Feldmeier | Dec. 29, 1931 |
| 2,236,208 | Creel | Mar. 25, 1941 |
| 2,260,385 | Krone et al. | Oct. 28, 1941 |